(12) United States Patent
Hwang et al.

(10) Patent No.: US 8,223,887 B2
(45) Date of Patent: Jul. 17, 2012

(54) TRANSMITTER, RECEIVER, AND METHOD OF SUPPORTING SPACE TIME BLOCK CODE SCHEME IN SINGLE CARRIER SYSTEM BASED ON UNIQUE WORD

(75) Inventors: Duck Dong Hwang, Yongin-si (KR); Chang Wook Ahn, Yongin-si (KR); Chang-Ho Choi, Pohang-si (KR); Gi Hong Lim, Pohang-si (KR); Jong-Bu Lim, Pohang-si (KR)

(73) Assignees: Samsung Electronics Co., Ltd., Suwon-si (KR); Postech Academy-Industry Foundation, Pohang-Si (KR)

( * ) Notice: Subject to any disclaimer, the term of this patent is extended or adjusted under 35 U.S.C. 154(b) by 753 days.

(21) Appl. No.: 11/775,348

(22) Filed: Jul. 10, 2007

(65) Prior Publication Data
US 2008/0089441 A1   Apr. 17, 2008

(30) Foreign Application Priority Data
Oct. 16, 2006   (KR) ........................ 10-2006-0100325

(51) Int. Cl.
H04L 27/00 (2006.01)
H04B 1/00 (2006.01)
H04B 7/216 (2006.01)
(52) U.S. Cl. .................... 375/299; 375/148; 370/320
(58) Field of Classification Search ............... 375/148, 375/299; 370/320
See application file for complete search history.

(56) References Cited

U.S. PATENT DOCUMENTS

| | | | |
|---|---|---|---|
| 6,891,897 B1 * | 5/2005 | Bevan et al. | 375/265 |
| 7,031,413 B2 | 4/2006 | Doi | |
| 7,424,063 B2 * | 9/2008 | Yee | 375/267 |
| 7,551,679 B2 * | 6/2009 | Liu et al. | 375/260 |
| 2003/0026348 A1 * | 2/2003 | Llang et al. | 375/267 |
| 2004/0120274 A1 * | 6/2004 | Petre et al. | 370/320 |
| 2005/0128966 A1 * | 6/2005 | Yee | 370/310 |
| 2005/0249269 A1 * | 11/2005 | Tomasin et al. | 375/148 |

FOREIGN PATENT DOCUMENTS

| | | |
|---|---|---|
| EP | 1239609 A3 | 9/2002 |
| KR | 10-2002-0020970 A | 3/2002 |
| KR | 102002-0086274 A | 11/2002 |
| KR | 10-2003-0007550 A | 1/2003 |

OTHER PUBLICATIONS

Huemer et al. Unique Word Based Phase Tracking Algorithms for SC/FDE_Systems. Globalcomm 2003, vol. 1, pp. 70-74.

(Continued)

*Primary Examiner* — David C. Payne
*Assistant Examiner* — Sarah Hassan
(74) *Attorney, Agent, or Firm* — Sughrue Mion, PLLC

(57) ABSTRACT

A transmitter, a receiver, and a method of supporting a space time block code (STBC) scheme in a single carrier (SC) system based on a unique word (UW) are provided. The transmitter supporting an STBC scheme in an SC system based on a UW includes: a space time (ST) encoder encoding a plurality of symbols, which has been received according to a predetermined pattern, using a space time encoding; a first UW adder generating a first transmission sequence by inserting a first UW after a first symbol, from the encoded plurality of symbols; and a second UW adder generating a second transmission sequence by inserting a second UW after a second symbol, from the encoded plurality of symbols.

5 Claims, 6 Drawing Sheets

OTHER PUBLICATIONS

Coon et al. "Channel and Noise Variance Estimation and Tracking Algorithms for Unique-Word Based Single-Carrier Systems" IEEE Transactions on Wireless Communications, vol. 5, No. 6, pp. 1488-1496.

Falconer et al. "Broadband Wireless Using Single Carrier and Frequency Domain Equalization" Invited overview paper for WPMC '02, Honolulu, Oct. 2002.

Coon et al. "Near-Opimal Unique Word Design in single-carrier block transmission systems" IEEE 2003 p. 303.

* cited by examiner

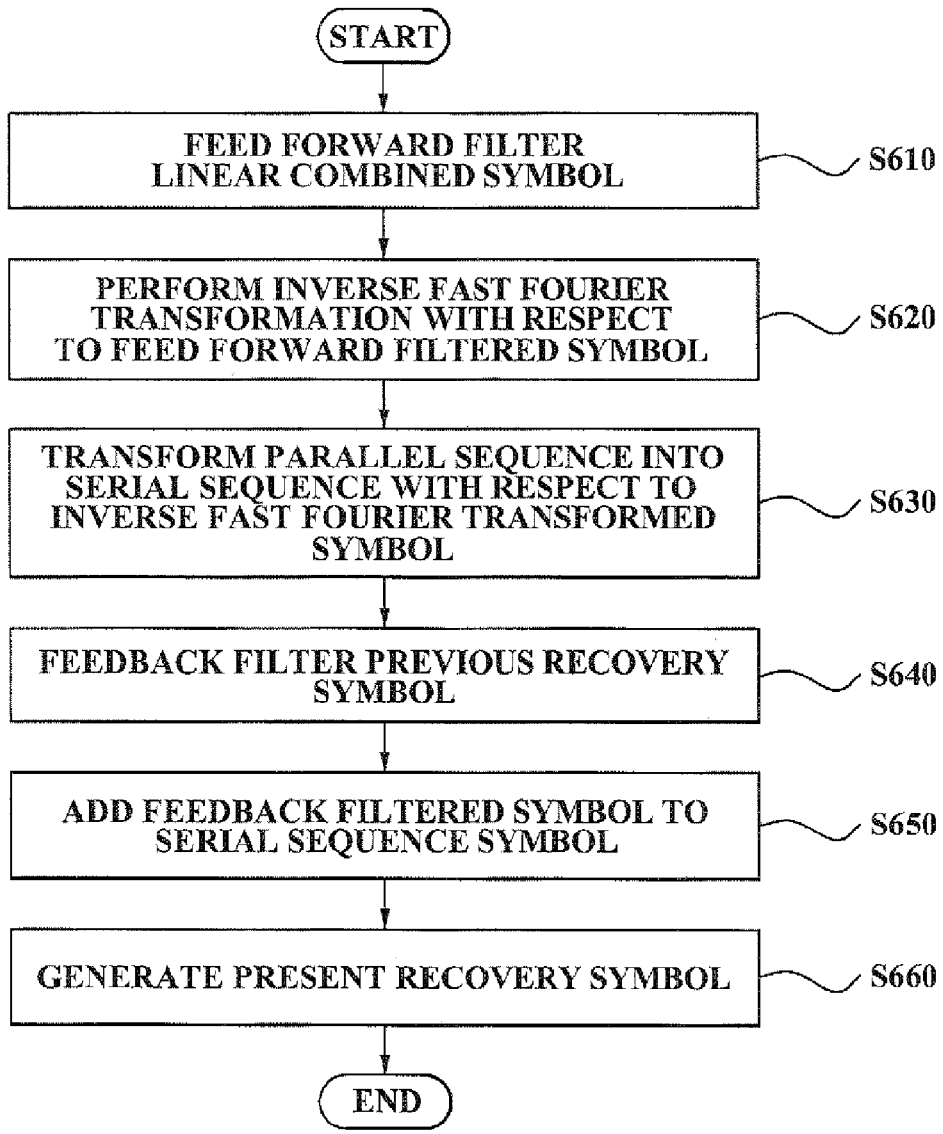

TRANSMITTER, RECEIVER, AND METHOD OF SUPPORTING SPACE TIME BLOCK CODE SCHEME IN SINGLE CARRIER SYSTEM BASED ON UNIQUE WORD

CROSS-REFERENCE TO RELATED APPLICATION

This application claims priority from Korean Patent Application No. 10-2006-0100325, filed on Oct. 16, 2006, in the Korean Intellectual Property Office, the entire disclosure of which is incorporated herein by reference.

BACKGROUND OF THE INVENTION

1. Field of the Invention

Methods and systems consistent with the present invention relate to supporting a space time block code (STBC) scheme and more particularly, to an equalization gain in a single carrier (SC) system based on a unique word (UW) which can acquire diversity gain, and can achieve enhanced performance without error propagation.

2. Description of Related Art

With increased demand for data transmission using a wireless communication system by users, services such as the third generation (3G) mobile communications are provided, and various research, enabling the users to more effectively perform data transmission of high speed and high quality, are briskly under way. Particularly, introduction of a multiple input multiple output (MIMO) system is necessary instead of a conventional single transmission/reception antenna since a substantially high capacity channel is required in next generation mobile communication systems, demanding high speed and high quality data transmission. The MIMO system indicates a multi-antenna system having multiple inputs and multiple outputs.

Particularly, research with respect increased reliability of transmission information of a transmitter and a receiver, is briskly under way. The transmitter and the receiver can acquire a diversity gain for the transmitted information by using an STBC scheme, i.e. a closed loop method which is not required to feedback channel information to a transmitter, and can increase volume of information by transmitting different information for each transmission antenna in the MIMO system.

Also, when a channel quickly changes in a high speed mobile environment, various types of distortions may occur while the transmitted signals pass through a transmission channel. There are various reasons for causing the various distortions, such as a power change of a received signal due to a fading phenomenon, and an interference due to other users, multi-path signals, a gaussain noise, an impulse noise, and a white noise. With respect to a channel equalization technology to reduce a bit detection error by correcting distortions occurring due to a poor quality transmission channel, an effort to enhance an equalization performance is under way for high speed and high quality data transmission.

However, a transmitter and a receiver supporting an STBC scheme in an SC system based on a cyclic prefix (CP) according to a conventional art have problems in that error propagation may occur due to a frequency domain-decision feedback equalization (FD-DFE), and it is difficult to use a pilot symbol for channel estimation and synchronization.

Therefore, a transmitter, a receiver, and a method which can acquire both a diversity gain and an equalization gain in a SC system based on a unique word (UW), and can achieve an enhanced performance without an error propagation is needed.

SUMMARY OF THE INVENTION

The present invention provides a transmitter, a receiver, and a method of supporting a space time block code (STBC) scheme which can acquire both a diversity gain and an equalization gain since a signal is transmitted according to a transmission sequence based on a unique word (UW), and the UW is used to recover orthogonality of a receiving sequence according to a received signal.

The present invention also provides a transmitter, a receiver, and a method of supporting an STBC scheme which can achieve an enhanced performance without error propagation since a signal is transmitted according to a transmission sequence based on a UW, and the UW is used to recover orthogonality of a receiving sequence according to a received signal.

According to an aspect of the present invention, there is provided a transmitter including: a space time (ST) encoder encoding a plurality of symbols, which has been received according to a predetermined pattern, using a space time encoding; a first UW adder generating a first transmission sequence by inserting a first UW after a first symbol, from the encoded plurality of symbols; and a second UW adder generating a second transmission sequence by inserting a second UW after a second symbol, from the encoded plurality of symbols.

According to another aspect of the present invention, there is provided a transmission method including: encoding a plurality of symbols, having been received according to a predetermined pattern, using a space time encoding; generating a first transmission sequence by inserting a first UW into a transmission sequence of a first symbol, from the encoded plurality of symbols; and generating a second transmission sequence by inserting a second UW into a transmission sequence of a second symbol, from the encoded plurality of symbols.

According to still another aspect of the present invention, there is provided a receiver including: a fast Fourier transform module performing a fast Fourier transformation with respect to a plurality of symbols of a receiving sequence, having been received according to a predetermined pattern; an interference component process module generating a second symbol having been eliminated with an interference component using a corresponding UW from the second symbol of the plurality of symbols; an STBC combination module generating a linear combined symbol from the second symbol having been eliminated with the interference component and the first symbol of the plurality of symbol; a frequency domain-decision feedback equalization (FD-DFE) module generating a present recovery symbol using a previous recovery symbol and the UW, from the linear combined symbol.

According to yet another aspect of the present invention, there is provided a receiving method including: transforming a time domain into a frequency domain with respect to a plurality of symbols of a receiving sequence, having been received according to a predetermined pattern; eliminating an interference component occurring in a second symbol of the plurality of symbols using a corresponding UW; linear combining a first symbol of the plurality of symbols with the second symbol having been eliminated with the interference component; and recovering the linear combined symbol using a symbol determined in a previous decoding operation in the frequency domain and the UW, and generating a receiving sequence of the recovered symbol.

BRIEF DESCRIPTION OF THE DRAWINGS

The above and other aspects and advantages of the present invention will become apparent and more readily appreciated from the following detailed description of certain exemplary embodiments of the invention, taken in conjunction with the accompanying drawings of which:

FIG. 6 is a flowchart illustrating generation of a receiving sequence of FIG. 5.

DETAILED DESCRIPTION OF EXEMPLARY EMBODIMENTS OF THE INVENTION

Figure 1:
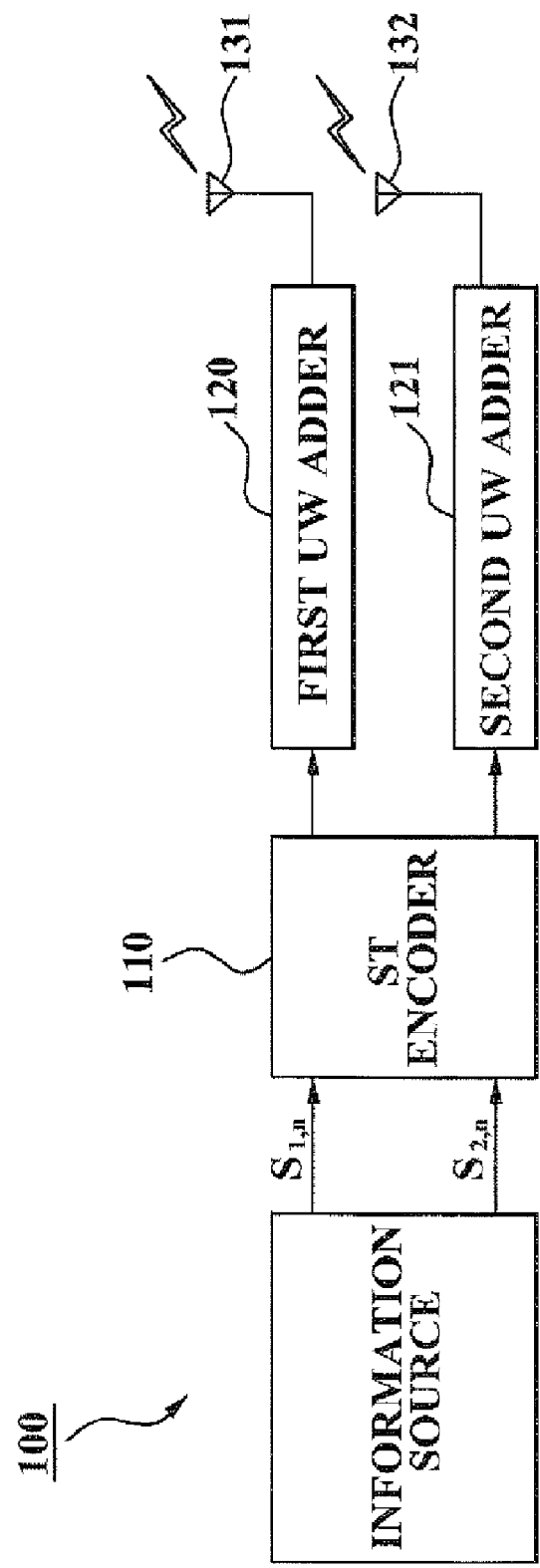
FIG. 1 is a configuration diagram illustrating a transmitter supporting a space time block code (STBC) scheme in a single carrier (SC) system based on a unique word (UW) according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

A mobile terminal including a transmitter and a receiver supporting a space time block code (STBC) scheme in a single carrier (SC) system based on a unique word (UW) according to the present invention may include a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, and a satellite/terrestrial Digital Multimedia Broadcasting (DMB) phone.

FIG. 1 is a configuration diagram illustrating a transmitter 100 supporting an STBC scheme in an SC system based on a UW according to an exemplary embodiment of the present invention.

As illustrated in FIG. 1, the transmitter 100 supporting the STBC scheme in the SC system based on the UW according to the exemplary embodiment of the present invention may include a space time (ST) encoder 110, a first UW adder 120, a second UW adder 121, a first transmission antenna 131, and a second transmission antenna 132. Wherein, the UW is used to recover orthogonality of a receiving sequence according to a received signal.

The ST encoder 110 encodes a plurality of symbols, having been received according to a predetermined pattern, using space time encoding, and the predetermined pattern may define the received plurality of symbols in a type of a matrix $$\begin{pmatrix} -s_{2,K}^* & s_{1,K} \\ s_{1,K}^* & s_{2,K} \end{pmatrix}.$$

The first UW adder 120 generates a first transmission sequence by inserting a first UW after a first symbol, from the encoded plurality of symbols, and the second UW adder 121 generates a second transmission sequence by inserting a second UW after a second symbol, from the encoded plurality of symbols.

The first transmission antenna 131 transmits the generated first transmission sequence, and the second transmission antenna 132 transmits the generated second transmission sequence. Hereinafter, a transmission method supporting an STBC scheme in an SC system based on a UW according to an exemplary embodiment of the present invention will be described by referring to FIG. 2.

Figure 2:
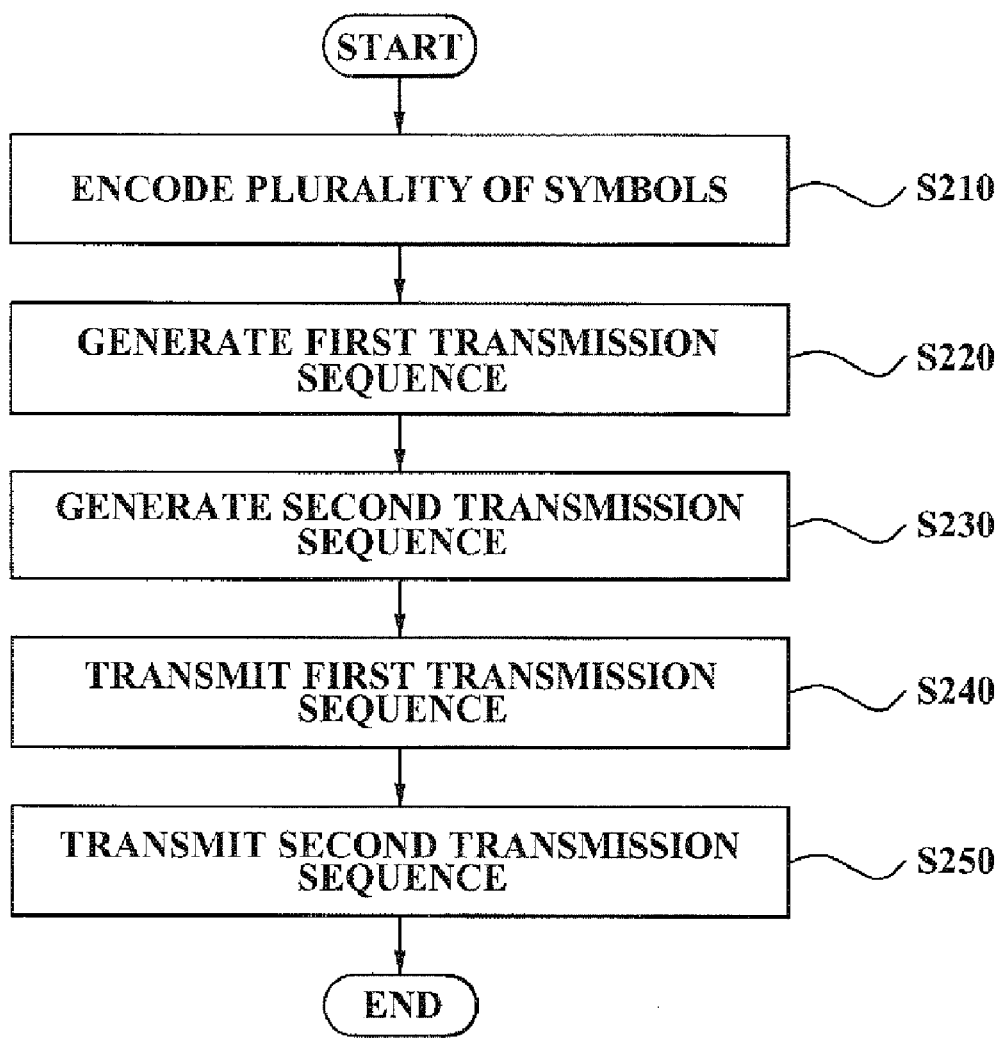
FIG. 2 is a flowchart illustrating a transmission method supporting an STBC scheme in an SC system based on a UW according to an exemplary embodiment of the present invention.

FIG. 2 is a flowchart illustrating a transmission method supporting an STBC scheme in an SC system based on a UW according to an exemplary embodiment of the present invention.

As illustrated in FIG. 2, the transmission method supporting the STBC scheme in the SC system based on the UW according to the exemplary embodiment of the present invention may include operations S210, S220, S230, S240, and S250. Operation S210 encodes a plurality of symbols, operation S220 generates a first transmission sequence, operation S230 generates a second transmission sequence, operation S240 transmits the first transmission sequence, and operation S250 transmits the second transmission sequence. Operations S210 through S250 may be respectively performed for each apparatus.

In operation S210, the ST encoder 110 encodes the plurality of symbols, having been received according to a predetermined pattern, using space time encoding.

In operation S220, the first UW adder 120 generates the first transmission sequence by inserting a first UW into a transmission sequence of the first symbol, from the plurality of symbols, and in operation S230, the second adder 121 generates the second transmission sequence by inserting a second UW into a transmission sequence of the second symbol, from the plurality of symbols. The generated first and second transmission sequences will be described by referring to FIG. 3.

Figure 3:
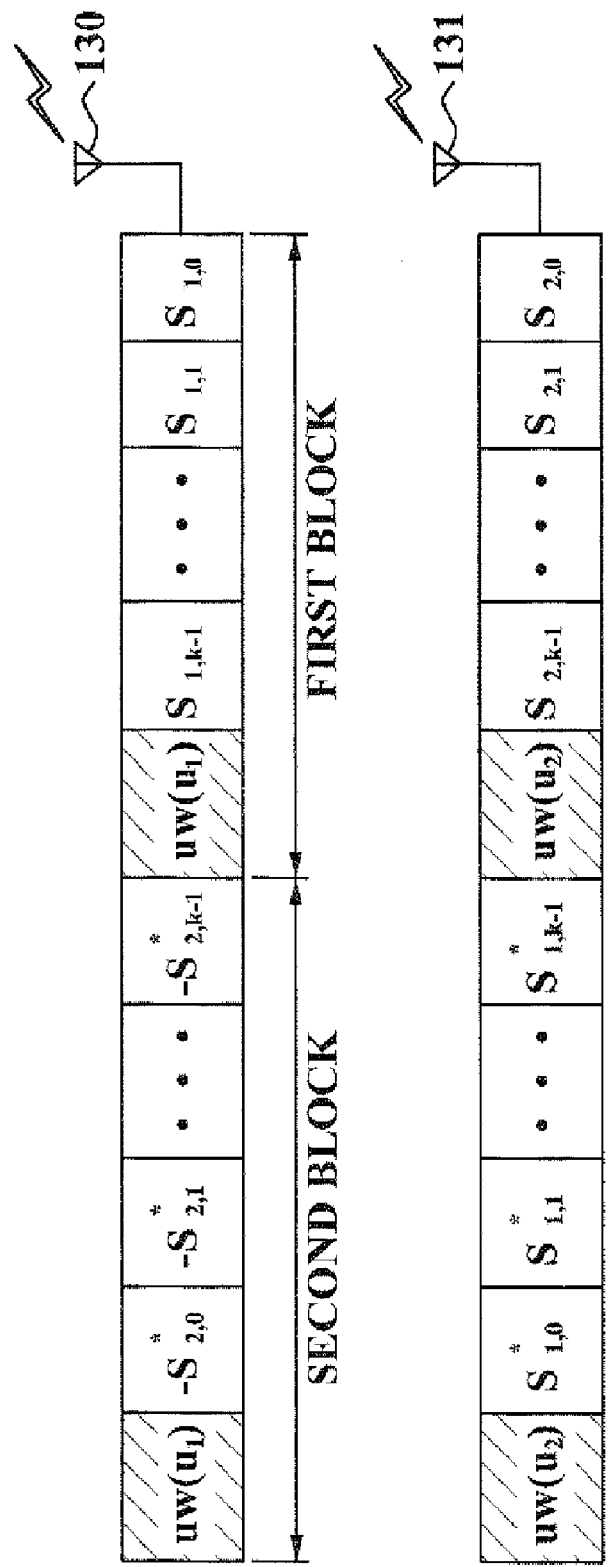
FIG. 3 is a diagram illustrating a transmission sequence in an SC system based on a UW according to an exemplary embodiment of the present invention.

FIG. 3 is a diagram illustrating a transmission sequence in an SC system based on a UW according to an exemplary embodiment of the present invention.

As illustrated in FIG. 3, a first transmission sequence in the SC system based on the UW according to the exemplary embodiment of the present invention may include a first block including K elements of symbols $s_{1,K}$ and a single first UW $u_1$ which follows the K number of symbols $s_{1,K}$, and a second block including K number of symbols $-s_{2,K}$ and a single first UW $u_1$ which follows the K number of symbols $-s_{2,K}^*$. In this case, the $s_{1,K}$ is arranged in an order of $s_{1,0}, \ldots, s_{1,K-1}$ and the $-s_{2,K}^*$ is arranged in an order of $-s_{2,K-1}^*, \ldots, -s_{2,0}^*$.

Similarly, a second transmission sequence in the SC system based on the UW according to the exemplary embodiment of the present invention may include a first block including K elements of symbols $s_{2,K}$ and a single second UW $u_2$, and a second block including K number of symbols $s_1^*$ and the single second UW $u_2$, and the $s_{2,K}$ is arranged in an order of $s_{2,0}, \ldots, s_{2,K-1}$ and the $s_1^*$ is arranged in an order of $s^*_{1,K-1}, \ldots, s^*_{1,0}$.

Consequently, a first transmission antenna 130 may transmit the generated first transmission sequence of operation S240 of FIG. 2, and a second transmission antenna 131 may transmit the generated second transmission sequence of operation S250 of FIG. 2. The first and second transmission sequences may be represented by, $$\begin{bmatrix} x_1^{(i)} & x_2^{(i)} \\ x_1^{(i+1)} & x_2^{(i+1)} \end{bmatrix} = \begin{bmatrix} \tilde{s}_1^{(i)} + \tilde{u}_1 & \tilde{s}_2^{(i)} + \tilde{u}_2 \\ -Q\tilde{s}_2^{(i)*} + \tilde{u}_1 & Q\tilde{s}_1^{(i)*} + \tilde{u}_2 \end{bmatrix} \quad \text{[Equation 1]}$$

In this case, the $\tilde{s}_m^{(i)}$ indicates a transpose matrix $[s_m^{(i)} \; 0_{G\times 1}]^T$, the $\tilde{u}_m$ indicates a transpose matrix $[0_{K\times 1} \; u_m]^T$, and the $x_m^{(i)}$ indicates a transpose matrix $[x_{m,0}^{(i)} \; x_{m,1}^{(i)} \cdots x_{m,N-1}^{(i)}]^T = [s_{m,0}^{(i)} \; s_{m,1}^{(i)} \ldots s_{m,K-1}^{(i)} \; u_{m,0} \; u_{m,1} \ldots u_{m,G-1}]^T = [s_m^{(i)} \; u_m]^T$.

Hereinafter, a receiver supporting an STBC scheme in an SC system based on a UW, according to an exemplary embodiment of the present invention will be described by referring to FIG. 4, with the receiver receiving the transmitted first and second transmission sequences, and decoding the received first and second transmission sequences.

Figure 4:
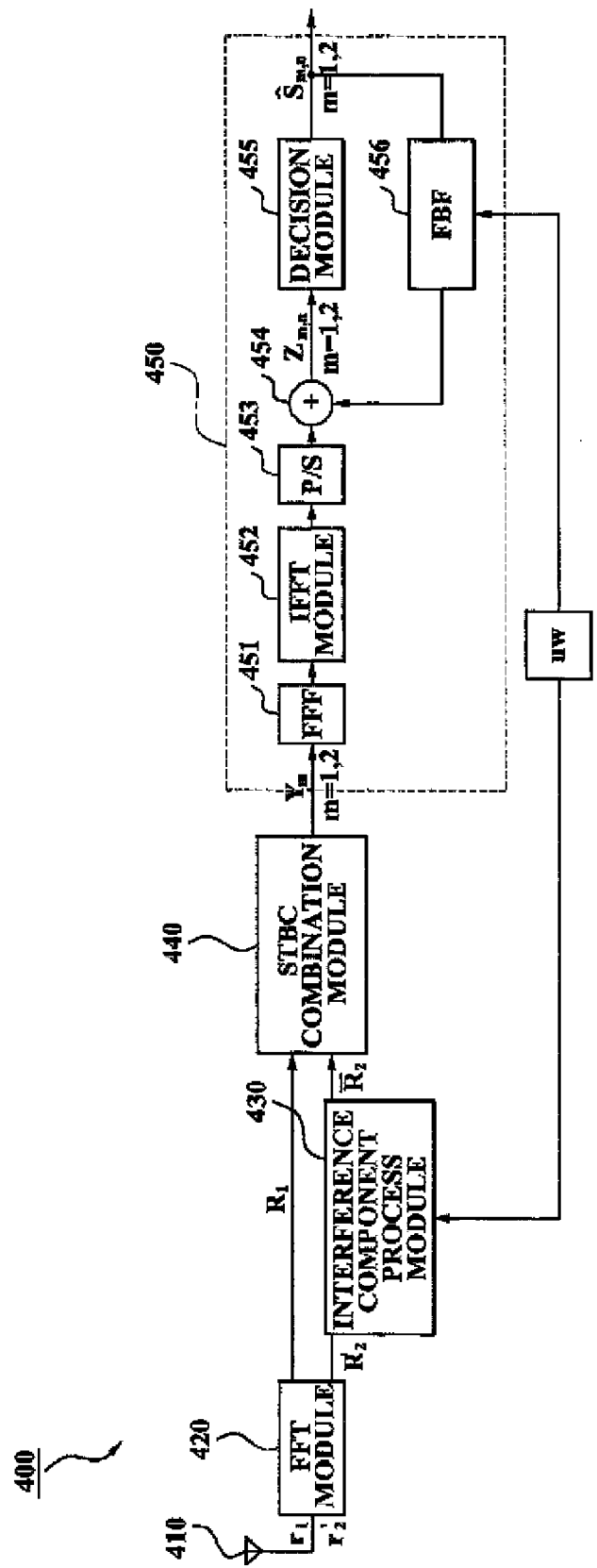
FIG. 4 is a configuration diagram illustrating a receiver supporting an STBC scheme in an SC system based on a UW according to an exemplary embodiment of the present invention.

FIG. 4 is a configuration diagram illustrating a receiver 400 supporting an STBC scheme in an SC system based on a UW according to an exemplary embodiment of the present invention.

As illustrated in FIG. 4, the receiver 400 supporting the STBC scheme in the SC system based on the UW according to the exemplary embodiment of the present invention may include a receiving antenna 410, a fast Fourier transform (FFT) module 420, an interference component process module 430, an STBC combination module 440, and a frequency domain-decision feedback equalization (FD-DFE) module 450.

The FD-DFE module 450 may include a feed forward filter (FFF) 451, an inverse fast Fourier transform (IFFT) module 452, a P/S module 453, a feedback filter (FBF) 456, an adder 454, and a decision module 455. Hereinafter, a receiving method supporting an STBC scheme in an SC system based on a UW according to the exemplary embodiment of the present invention will be described by referring to FIG. 5.

Figure 5:
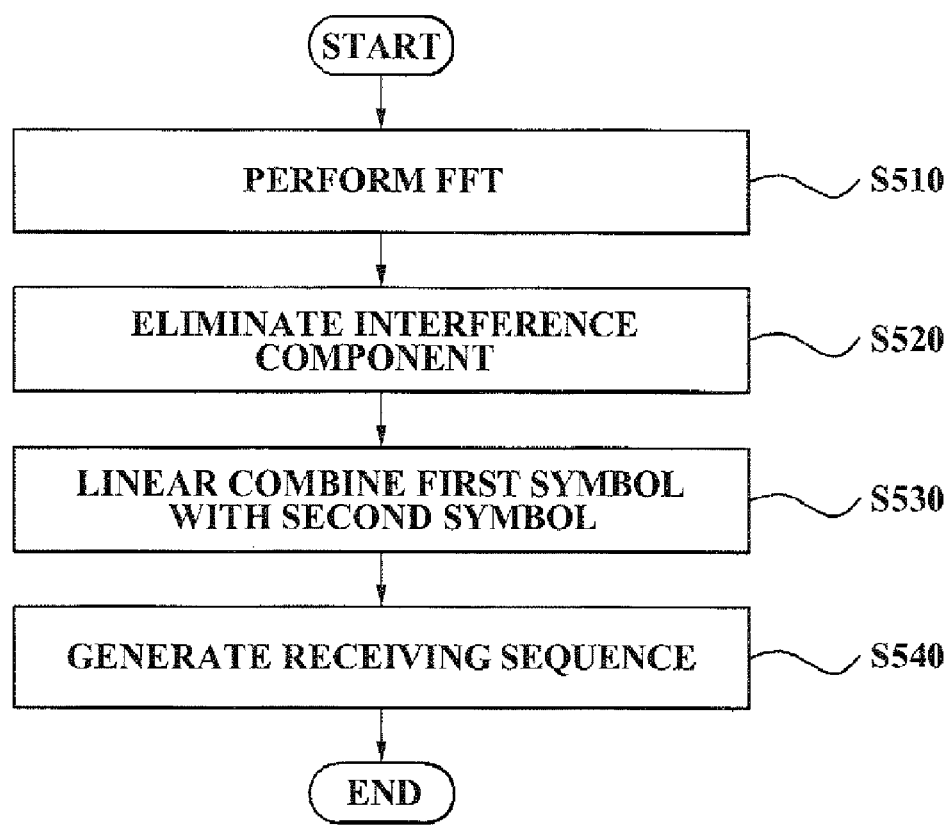
FIG. 5 is a flowchart illustrating a receiving method supporting an STBC scheme in an SC system based on a UW according to an exemplary embodiment of the present invention.

FIG. 5 is a flowchart illustrating a receiving method supporting an STBC scheme in an SC system based on a UW according to an exemplary embodiment of the present invention.

As illustrated in FIG. 5, the receiving method supporting the STBC scheme in the SC system based on the UW according to the exemplary embodiment of the present invention includes performing an FFT in operation S510, eliminating an interference component in operation S520, linear combining a first symbol with a second symbol in operation S530, and generating a receiving sequence in operation S540.

Initially, the receiver 400 of FIG. 4 supporting the STBC scheme in the SC system based on the UW according to the exemplary embodiment of the present invention may receive a plurality of symbols $r_1, r'_2$ via the receiving antenna 410 of FIG. 4, and the plurality of symbols $r_1, r'_2$ may be represented by, $$r_1 \triangleq r^{(i)} \quad \text{[Equation 2]}$$
$$= H_1^{(i)} x_1^{(i)} + H_2^{(i)} x_2^{(i)} + n_1,$$
$$H_m \triangleq H_m^{(i)}$$
$$= H_m^{(i+1)}$$
$$r_2 \triangleq r^{(i+1)}$$
$$= H_1^{(i+1)} x_1^{(i+1)} + H_2^{(i+1)} x_2^{(i+1)} + n_2,$$
$$i = 0, 2, 4, \ldots,$$
$$r'_2 = P r_2$$
$$= H_1(-PQ\tilde{s}_2^* + P\tilde{u}_1) + H_2(PQ\tilde{s}_1^* + P\tilde{u}_2) + Pn_2.$$

In this case, the 'P' and 'Q' respectively indicate an N×N cyclic shift permutation matrix and a reversed cyclic shift permutation matrix.

In operation S510, the FFT 420 of FIG. 4 may perform an FFT with respect to the received plurality of symbols, i.e., may transform a time domain into a frequency domain with respect to the received plurality of symbols, which may be represented by, $$R_1 = Wr_1 \quad \text{[Equation 3]}$$
$$= \Lambda_1 X_1 + \Lambda_2 X_2 + N_1.$$
$$R'_2 = Wr'_2$$
$$= \Lambda_1(-WPQ\tilde{s}_2^* + WP\tilde{u}_1) +$$
$$\quad \Lambda_2(WPQ\tilde{s}_1^* + WP\tilde{u}_2) + WPn_2$$
$$= \Lambda_1(-\overline{S}_2^* + WP\overline{u}_1) + \Lambda_2(\overline{S}_1^* + WP\overline{u}_2) + \overline{N}_2.$$

In this case, Equation 2 may include interference components $WP\overline{u}_1$ and $WP\overline{u}_2$ by a UW, and the interference component process module 430 may generate a second symbol having been eliminated with the interference components $WP\overline{u}_1$ and $WP\overline{u}_2$, using a corresponding UW, from the second symbol of the plurality of symbols, in operation S520. The second symbol having been eliminated with the interference components $WP\overline{u}_1$ and $WP\overline{u}_2$ may be represented by, $$\overline{R}_2 = R'_2 - (\Lambda_1 U'_1 + \Lambda_2 U'_2) + (-\Lambda_1 U_2^* + \Lambda_2 U_1^*) \quad \text{[Equation 4]}$$
$$= R'_2 - \Lambda_1(U_2^* + U'_1) + \Lambda_2(U_1^* - U'_2)$$
$$= -\Lambda_1(\overline{S}_2^* + U_2^*) + \Lambda_2(\overline{S}_1^* + U_1^*) + \overline{N}_2$$
$$= -\Lambda_1 X_2^* + \Lambda_2 X_1^* + \overline{N}_2.$$

Namely, the plurality of symbols in the frequency domain may be represented by, $$R \triangleq \begin{bmatrix} R_1 \\ \overline{R}_2^* \end{bmatrix} \quad \text{[Equation 5]}$$
$$= \begin{bmatrix} \Lambda_1 & \Lambda_2 \\ -\Lambda_2^H & \Lambda_1^H \end{bmatrix} \begin{bmatrix} X_1 \\ X_2 \end{bmatrix} + \begin{bmatrix} N_1 \\ \overline{N}_2^* \end{bmatrix}$$
$$\triangleq \Lambda X + N.$$

The STBC combination module 440 of FIG. 4 may generate a linear combined symbol by linear combining the first symbol of the plurality of symbols with the second symbol in operation S530 having been eliminated with the interference components $WP\bar{u}_1$ and $WP\bar{u}_2$ in operation S520, which may be represented by, $$Y \triangleq \begin{bmatrix} Y_1 \\ Y_2 \end{bmatrix} = \Lambda^H R = \begin{bmatrix} \bar{\Lambda} & 0 \\ 0 & \bar{\Lambda} \end{bmatrix} \begin{bmatrix} X_1 \\ X_2 \end{bmatrix} + \tilde{N} \quad \text{[Equation 6]}$$

$$Y_1 = \bar{\Lambda} X_1 + \tilde{N}_1, Y_2 = \bar{\Lambda} X_2 + \tilde{N}_2,$$

In this case, the $\bar{\Lambda}$ indicates a N×N diagonal matrix defined in $|\Lambda_1|^2 + |\Lambda_2|^2$.

In operation S540, the FD-DFE module 450 may generate a receiving sequence by generating a present recovery symbol using a previous recovery symbol and the UW, from the linear combined symbol. The generation of the receiving sequence of FIG. 5 by generating the present recovery symbol will be described by referring to FIG. 6.

FIG. 6 is a flowchart illustrating generating of the receiving sequence of FIG. 5.

As illustrated in FIG. 6, the generating of the receiving sequence of FIG. 5 may include feed forward filtering in operation S610, inverse fast Fourier transforming in operation S620, transforming a parallel sequence into a serial sequence in operation S630, feedback filtering in operation S640, adding the feedback filtered symbol to a serial sequence symbol in operation S650, and generating a present recovery symbol in operation S660.

Hereinafter, the generation of the receiving sequence of FIG. 5 will be described in detail.

The FFF 451 feed forward filters the linear combined symbol in operation S610, and the inverse fast Fourier transform module performs an inverse fast Fourier transformation with respect to the feed forward filtered symbol in operation S620.

The P/S module 453 transforms the parallel sequence into the serial sequence with respect to the inverse fast Fourier transformed symbol in operation S630, and the FBF 456 feedback filters the previous recovery symbol using the UW in operation S640.

The adder 454 adds the feedback filtered symbol to the serial sequence symbol in operation S650, the adding result may be represented by, $$z_{m,n} = \frac{1}{\sqrt{N}} \sum_{k=0}^{N-1} G_{FF,k} Y_{m,k} e^{j2\pi k/N} + \sum_{p=0}^{B-1} g_{FB,p} \hat{x}_{m,(n-p-1)_N}, \quad \text{[Equation 7]}$$

$$m = 1, 2,$$

$$n = 0, 1, \ldots, K-1$$

In this case, the 'B' indicates a number of a feedback tab, the $G_{FF,k}$, k=0, . . . , N−1 indicates a coefficient of the FFF 451, and the $g_{FB,p}$, p=0, . . . , B−1 indicates a coefficient of the FBF 456.

The decision module 455 generates the present recovery symbol by determining each symbol data according to the adding result, consequently the receiving sequence is generated in operation S660.

The above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, the transmitter, the receiver, and a method thereof supporting an STBC scheme in an SC system based on a UW according to the exemplary embodiment of the present invention can acquire both a diversity gain and an equalization gain since a signal is transmitted according to a transmission sequence based on a UW, and the UW is used to recover orthogonality of a receiving sequence according to a received signal.

Also, the transmitter, the receiver, and a method of supporting an STBC scheme in an SC system based on a UW according to the exemplary embodiment of the present invention which can achieve an enhanced performance without an error propagation since a signal is transmitted according to a transmission sequence based on a UW, and the UW is used to recover orthogonality of a receiving sequence according to a received signal.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A receiver supporting a space time block code (STBC) scheme in a single carrier (SC) system based on a unique word (UW), the receiver comprising:
   a receiving antenna that receives a receiving sequence, the receiving sequence comprising a plurality of symbols and a UW;
   a fast Fourier transform module which performs a fast Fourier transformation of the receiving sequence;
   an interference component process module which eliminates an inter symbol interference component introduced by the UW and a second symbol of the plurality of symbols in the receiving sequence from the receiving sequence based on the UW to generate an interference-eliminated receiving sequence;
   an STBC combination module which combines the interference-eliminated second symbol and a first symbol of the plurality of symbols to generate a linear combined symbol; and
   a frequency domain-decision feedback equalization (FD-DFE) module which generates a present recovery symbol using a previous recovery symbol and the UW, from the linear combined symbol.

2. The receiver of claim 1, wherein the FD-DFE module comprises:
- a feed forward filter feed forward filtering the linear combined symbol;
- an inverse fast Fourier transform module performing an inverse fast Fourier transformation with respect to the feed forward filtered symbol;
- a parallel to serial (P/S) module transforming a parallel sequence into a serial sequence of the inverse fast Fourier transformed symbol;
- a feedback filter (FBF) feedback filtering the previous recovery symbol using the UW;
- an adder adding the feedback filtered symbol to the serial sequence symbol; and
- a decision module generating the present recovery symbol by determining each symbol data according to the adding result.

3. A receiving method supporting a space time block code (STBC) scheme in a single carrier (SC) system based on a unique word (UW), the method comprising:
- receiving a receiving sequence according to a predetermined pattern, the receiving sequence comprising a plurality of symbols and a UW;
- transforming a time domain of the plurality of symbols and the UW into a frequency domain;
- eliminating an inter symbol interference component introduced by the UW and a second symbol of the plurality of symbols in the receiving sequence based on the UW to generate an interference-eliminated receiving sequence;
- linear combining a first symbol of the plurality of symbols with the interference-eliminated second symbol to generate a linear combined symbol; and
- recovering the linear combined symbol using a symbol determined in a previous decoding operation in the frequency domain and the UW, and generating a receiving sequence of the recovered symbol.

4. The receiving method of claim 3, wherein the generating of the receiving sequence of the recovered symbol comprises:
- filtering the linear combined symbol;
- transforming a frequency domain into a time domain with respect to the filtered symbol;
- transforming a parallel sequence into a serial sequence with respect to the receiving sequence of the transformed symbol;
- filtering the symbol determined in the previous decoding operation using the UW;
- adding the filtered symbol to the plurality of symbols of the receiving sequence; and
- generating a receiving sequence of the recovered symbol according to determination of the symbol having been added with the filtered symbol.

5. A non-transitory computer-readable storage medium storing a program for implementing a receiving method supporting an STBC scheme in an SC system based on a UW, the method comprising:
- transforming a time domain into a frequency domain with respect to a plurality of symbols and a UW corresponding to the plurality of symbols of a receiving sequence, having been received according to a predetermined pattern;
- eliminating an inter symbol interference component introduced by the UW and a second symbol of the plurality of symbols in the receiving sequence from the receiving sequence based on the UW to generate an interference-eliminated receiving sequence;
- linear combining a first symbol of the plurality of symbols with the interference-eliminated second symbol to generate a linear combined symbol; and
- recovering the linear combined symbol using a symbol determined in a previous decoding operation in the frequency domain and the UW, and generating a receiving sequence of the recovered symbol.

* * * * *